US007076110B2

(12) United States Patent
Kempf

(10) Patent No.: US 7,076,110 B2
(45) Date of Patent: Jul. 11, 2006

(54) QUANTIZATION ERROR DIFFUSION FOR DIGITAL IMAGING DEVICES

(75) Inventor: Jeffrey M. Kempf, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 513 days.

(21) Appl. No.: 10/196,918

(22) Filed: Jul. 17, 2002

(65) Prior Publication Data

US 2003/0031373 A1 Feb. 13, 2003

Related U.S. Application Data

(60) Provisional application No. 60/311,265, filed on Aug. 9, 2001.

(51) Int. Cl.
*G06K 9/36* (2006.01)
*G06K 15/00* (2006.01)
*G09G 5/00* (2006.01)

(52) U.S. Cl. ...................... 382/252; 345/616; 358/3.03

(58) Field of Classification Search ......... 382/237.238, 382/250–252, 162; 358/1.9, 2.19, 3.01, 3.03–3.06, 358/3.21–3.24; 345/616; 348/607, 770, 348/771

See application file for complete search history.

(56) References Cited

U.S. PATENT DOCUMENTS 5,245,678 A * 9/1993 Eschbach et al. ........... 382/252
5,377,041 A * 12/1994 Spaulding et al. .......... 358/518
5,479,170 A * 12/1995 Cauwenberghs et al. ... 341/200
6,173,081 B1 * 1/2001 Nishikawa .................. 382/252
6,608,700 B1 * 8/2003 Mantell ...................... 358/1.9

* cited by examiner

*Primary Examiner*—Kanjibhai Patel
(74) *Attorney, Agent, or Firm*—Charles A. Brill; Wade James Brady, III; Frederick J. Telecky, Jr.

(57) ABSTRACT

A quantization method and system (20) for quantizing image data. A look up table (23) is used to provide non binary values for one or more bits of an input pixel value, as well as to provide a quantization error value. The quantization may be conditional, such that the look up table (23) is used to determine whether the input pixel value is to be quantized by the look up table (23) in non binary manner or whether it is to be quantized by a conventional binary quantizer (26). Where the look up table (23) quantizes only a portion of the input value, the remaining portion is delivered to the binary quantizer (26). The result is an output value, at least some of whose bits represent non binary values.

20 Claims, 2 Drawing Sheets

QUANTIZATION ERROR DIFFUSION FOR DIGITAL IMAGING DEVICES

This application claims priority under 35 USC § 119(e)(1) of provisional application No. 60/311,265 filed Aug. 9, 2001.

TECHNICAL FIELD OF THE INVENTION

This invention relates to digital image processing, and more particularly to techniques for diffusing quantization error.

BACKGROUND OF THE INVENTION

As computers become more adept at displaying graphics, pixels that use 16 bits and 24 bits are becoming more frequently available as input data. However, not all display devices can handle these greater pixel sizes.

Strictly speaking, quantization is the procedure of approximating continuous values with discrete values; in practice, the input values to the quantization procedure are often also discrete, but with a much finer resolution than that of the output values. The goal of quantization usually is to produce a more compact representation of the data while maintaining its usefulness for a certain purpose. For example, to store color intensities you can quantize floating-point values in the range [0.0, 1.0] to integer values in the range 0–255, representing them with 8 bits, which is considered a sufficient resolution for many applications dealing with color. When the spacing of possible values is the same over the entire discrete set, the quantization is said to be uniform. Often, a nonuniform spacing is more appropriate when better resolution is needed over some parts of the range of values.

A problem with quantization is quantization error, which can cause artifacts in the image. Various forms of dithering have been developed to reduce the perceptible results of quantization error.

Error diffusion is a form of dithering in which quanitization errors are diffused to "future" pixels. Error diffusion attempts to spread the error locally. The argument is that, because the error appears close to where it should be, it need not become visible as an artifact in the picture. Originally intended for grayscale images, error diffusion may be extended to color images by error diffusing each of the three color planes independently.

A rough explanation about how error diffusion works is that it takes the red, green, and blue values from the original pixel, finds the best matching pixel in the goal palette, then it finds the difference of the original and final pixel's red, green, and blue values, and adds a fraction of this value to the nearby pixels in the original graphic. In other words, error diffusion reduces local quantization error by filtering the quantization error in a feedback loop. The objective is to balance the red, green, and blue components to make the result look as convincing as possible.

SUMMARY OF THE INVENTION

One aspect of the invention is-a non binary quantization unit for a digital imaging system. Where the entire input value is to be quantized in a non binary manner, the quantizer comprises an adder, a look up table, and an error diffusion filter. The adder adds an input value to a diffused error value, thereby producing an error-corrected input value. The look up table receives and converts the error-corrected input value to a non binary output value and determines the quantization error value. The error diffusion filter filters the quantization error and delivers the filtered, diffused error value to the adder.

Where only a portion of the input value is to be quantized in a non binary manner, the quantization unit further comprises a multiplier, an adder, and a binary quantizer. The multiplier and adder are used to shift the input value so that non binary bits can be added to the output value, and the binary quantizer quantizes the appropriate bits of the output value.

An advantage of the invention is that it can be used to provide non binary pixel values. These values can be used to optimize the operation of the imaging system, such as by providing pixel values that can displayed in time slices that conform to a minimum time slice available in a particular system.

DETAILED DESCRIPTION OF THE INVENTION

The following description is directed to a quantization method and its implementing hardware, referred to herein as a quantization unit. For purposes of example, the quantization method and hardware are described in the context of a DMD (digital micro-mirror device) display system, which is a type of spatial light modulator system. An example of a DMD system that incorporates the quantization unit is explained below in connection with FIG. 3.

The principles described herein could also be applied to other digital imaging systems, both for printing and display. Typically, the invention is used for imaging systems in which data is displayed in accordance with time slices, and in which system limitations result in time slices that are not necessarily dictated by binary patterns. Examples of other imaging systems, with which the invention could be useful, are spatial light modulator systems other than DMD systems, particularly display systems such as liquid crystal displays and other flat panel displays.

In the case of a DMD, image data is displayed in time slices, the minimum of which is a LSB time slice. Each frame of pixel data has a duration of 6 milliseconds, and for an 8-bit system in which quantization patterns are all binary, 255 LSB time slices are available. Thus, the duration of each LSB time slice is 6 ms/255=23.5 microseconds. For a 9-bit system, the duration of each LSB time slice would be 6 ms/511=11.75 microseconds. Because of switching time constraints associated with the DMD device, the fastest LSB time slice that can be actually used is 17 microseconds. Thus, if an all binary quantization pattern is used, the use of 8-bit pixel values fails to optimize the DMD, whereas the use of 9-bit pixel values exceeds the capability of the DMD.

Figure 1:
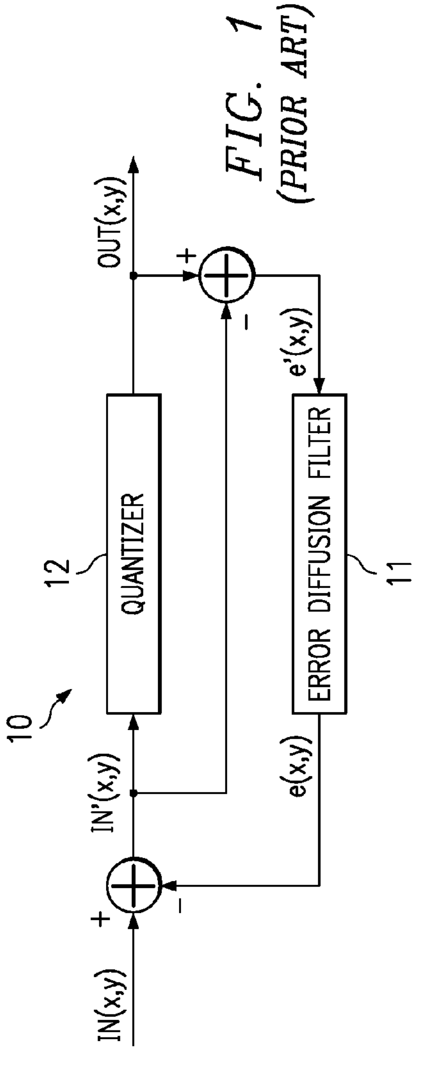
FIG. 1 (PRIOR ART)
FIG. 1 is a block diagram of a conventional quantizer with an error diffusion filter.

FIG. 1 illustrates a conventional quantization unit 10. Truncation error, e(x,y), processed by an error diffusion filter 11, is added to the incoming pixel value, In(x,y). This sum produces the error-compensated pixel, In'(x,y). The error-compensated pixel is then quantized by a quantizer 12, resulting in the output pixel, Out(x,y). The difference between the output pixel and the error-compensated pixel forms the new truncation error, e'(x,y), which is then processed by the error diffusion filter 11. The quantization unit 10 of FIG. 1 is assumed to follow all binary patterns, in which each quantization step is accorded a binary weight. More specifically, it operates in binary space, where bits weights increase by a factor of 2. However, as explained below, the present invention makes use of a solution space that is non binary and non uniform.

Figure 2:
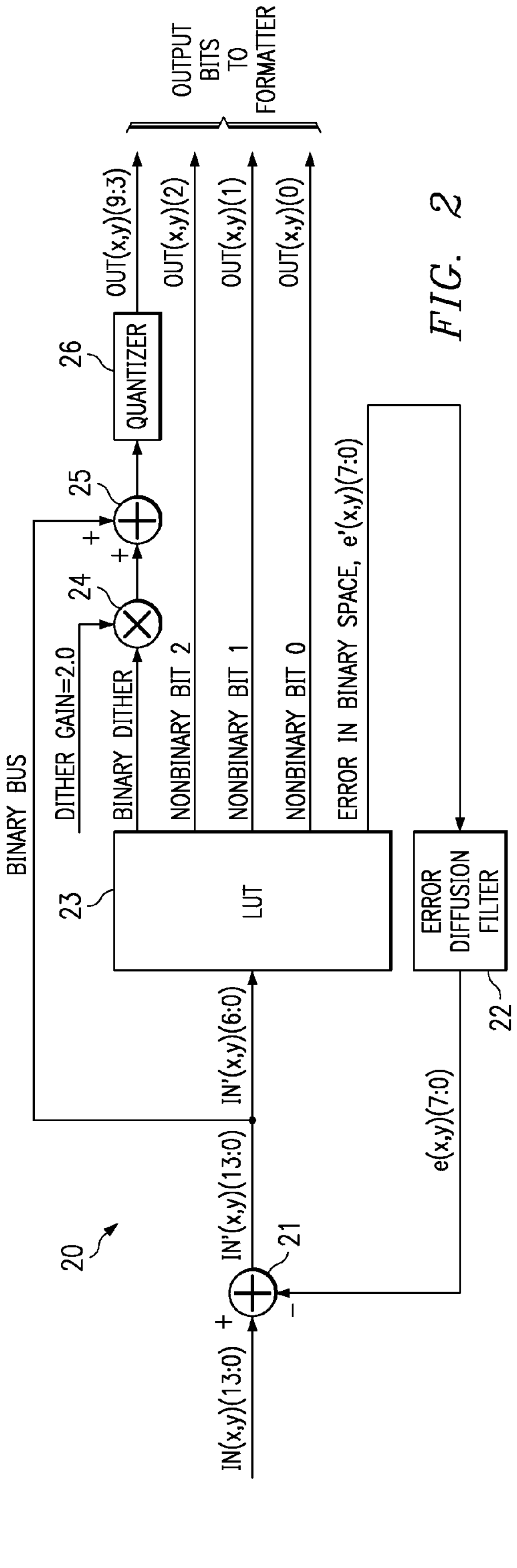
FIG. 2 is a block diagram of a quantizer with non binary error diffusion in accordance with the invention.

FIG. 2 illustrates a quantization unit 20 in accordance with the invention. Bit resolutions illustrated in FIG. 2 and described herein are for purposes of example, and could be otherwise, depending on the characteristics of the system.

The incoming bit stream is comprised of 14 bit pixel values. The bit weights are all binary. In other words, the magnitude of each bit increases by a factor of two as the value increases in binary space. Thus, the input value has 14-bit binary precision.

In the example of this description, each 14-bit value has 8 significant bits and 6 fractional bits. Significant bits are those that represent an integer number. Thus, 8 significant bits may be used to represent any integer between 0 and 255. The least significant bit is $2^0$ and the most significant bit is $2^7$. Fractional bits are bits that represent the fractional part of a rational number. Thus, 6 significant bits may be used to represent 64 quantized steps between 0 and 1. The "binary point" is located at bit 7. The least significant fractional bit is equal to $2^{-6}$=0.015625. The most significant fractional bit is equal to $2^{-1}$. Significant bits combined with fractional bits represent a rational number.

As an example of 14-bit binary precision using fractional bits, the number 213.203125 in decimal space is equal to 11010101001101, or $2^7+2^6+2^4+2^2+2^0+2^{-3}+2^{-4}+2^{-6}$= 213.203125.

For a DMD system, the 14-bit fractional input is the result of degamma processing. The fractional bits provide greater precision for improved gamma correction. In other embodiments, the input data may be non fractional.

In a DMD display system, the output of the quantizer 20 is to be delivered to a formatter that formats the data in a bit-plane format, which ensures that the DMD is turned on or off for a desired length of time. It is assumed that the display device cannot display pixels with binary 14-bit precision. Therefore, the precision must be reduced.

In the example of this description, the precision is to be reduced to 10 bits. A feature of the invention is the use of a quantization method that uses non binary bit weights. These non-binary bit weights do not follow the factor of 2 change that binary bit weights follow. Instead, they may increase by any factor.

In the example of this description, the 10-bit output value has 7 binary bits and 3 non binary bits. The non binary bits have the following bit weights:

bit 0=0.7
bit 1=1.1
bit 2=1.5

These bit weights may vary according to various parameters of the display system. As explained below, in the output data, these three bits "replace" bit 0 of the binary input pattern. Bit 3 of the output data represents the value 2, which was represented by bit 1 of the binary input.

The binary bits of the 10-bit output follow the binary weight rule:

bit 3=2
bit 4=4
bit 5=8
bit 6=16
bit 7=32
bit 8=64
bit 9=128

As explained below, quantization unit 20 processes the 14-bit binary input. The processing results in a 10 -bit output with 7 binary bits and 3 non binary bits.

In the case of a DMD imaging system, the output bit precision (here 10 bits) and the non binary weights are determined from switching limitations of the DMD. They permit the LSB time slice to be 17 microseconds, or whatever other duration is desired, thereby optimizing the operating capabilities of the DMD.

Variations of the invention might use other output precisions and other non binary bit weights. Furthermore, any number of bits of the input data (not just bit 0) may be quantized to non binary bits. In theory, any input bit could be quantized to any number of non binary bits.

In the examples below, only the LSB of the input data is evaluated for non binary quantization and quantized accordingly. In this sense, quantization unit 20 performs both non binary and binary quantization, using both LUT 23 and quantizer 26. LUT 23 provides a special bit that determines whether binary or non binary quantization is to be performed on the LSB of the input data. However, in other embodiments, the binary versus non binary quantization decision could be non conditional. Also, LUT 23 could be used to convert additional bits, or even the entire input pixel value, in a non binary manner. In the latter case, none of the input data need be processed through quantizer 26.

The operation of quantization unit 20 is best explained with an example. The current pixel value is denoted as In(x,y)(13:0), meaning that it is a 14-bit value. It is equal to 3.71875. The filter error is an 8-bit value, e(x,y)(7:0), and is equal to −0.15625. The error-corrected pixel value, In'(x,y)(13:0), is the sum of the input value and the filter error value as obtained by adder 21. The result is 3.71875−(−0.15625)= 3.875. Filter 22 may be implemented using known error diffusion filter techniques. In general, it determines how to diffuse the quantization error to neighboring pixels.

The 7 LSB's (least significant bits) of In'(x,y)(13:0) are used as a read address into the non-binary LUT (look-up table) 23. These 7 LSB's are denoted as In'(x,y)(6:0) in FIG. 2. The number of bits used as the read address is related to the frequency with which the quantization pattern is repeated. In the examples of this description, the pattern repeats every even number (modulo two), two being represented by the 8th bit position of the input data.

LUT 23 determines when to turn on or off a non-binary bit, whether to dither the binary bus, and how much error is to be diffused to adjacent pixels. LUT 23 may be implemented with a conventional memory device, such as RAM or ROM. In the example of this description, an appropriate size for a memory chip to implement LUT 23 is 128×12 bits.

LUT 23 has 12 output values. It sets a 1-bit binary dither value to either 0 or 1, depending on whether binary or non binary dithering is to occur. It also sets three non binary bit values to either 1 or 0. If binary dithering is to occur, they are each set to 0; if non binary dithering is to occur, they are set to 0 or 1 depending on the desired non binary dithering value. It further sets an 8-bit error value, which is delivered to error diffusion filter 22.

Using the 7 LSB's of In'(x,y)(13:0) results in an LUT read address of 1.875. LUT 23 determines whether the quantization error would be lower by using a combination of non-binary bits or by rounding up to the next quantized binary value. In this example, the lowest quantization error can be produced by quantizing 3.875 to 2, and by turning on both non-binary bit 0=0.7 and non binary bit 1=1.1. The result is a value of 2+1.1+0.7=3.8 and a quantization error of 0.075. This error is filtered by filter 22 and fed back to subsequent pixels. The alternative quantization error would be that produced by setting the binary dither value to 1 and the non binary bit values to 0, but this would produce a larger quantization error than 0.075. Thus, non binary dithering through LUT 23 is performed.

The binary dither value is set to 0. The two lower non binary bits are set as Out(x,y)(0)=1 and Out(x,y)(1)=1. In this manner, LUT 23 quantizes the incoming pixel value with non-uniformly spaced bits and determines the quantization error.

Quantizer 26 receives the 14-bit binary input. It first removes the lower 7 bits of the 14-bit binary bus. The LSB of the remaining 7 bits (which represents a value of 2) is set Out(x,y)(3)=1. Its output is bits 9–3 of the 10-bit output value, as indicated by the notation Out(x,y)(9:3).

With the addition of the non binary bits, the 10-bit output value 3.8 is produced, where 2+1.1+0.7=3.8. Expressed more formally, Out(x,y)(9:3)=0000001 and Out(x,y)(2:0)=011.

The above example illustrates a case in which the dithering is non binary. The following example illustrates a case in which the dithering is binary.

Let In(x,y)(13:0)=5.6375 and let e(x,y)(7:0)=0.3. The error-corrected pixel value and the output of adder 21 is In'(x,y)(13:0) and is equal to 5.9375. The 7 LSB's produce a read address of 1.9375 into LUT 23. In this example, the quantization error is lower by dithering the binary portion of the output bus and rounding up to the next binary value. In other words, 2 is closer to 1.9375 than 1.8, which is the closest non binary combination. The quantized error, 0.0625 is filtered by filter 22 and fed back to subsequent pixels.

LUT 23 sets the non binary bits to 0 and the binary dither bit to 1. Multiplier 24 multiplies the binary dither bit by 2. Adder 25 adds the result to the 14-bit binary bus, producing the sum 7.9375. Quantizer 26 removes the lower 7 bits. The output pixel value is 6, expressed using the notation Out(x,y)(9:3)=0000011 and Out(x,y)(2:0)=000.

In other embodiments, the size of LUT 23 and the dither gain applied by multiplier 24 could be adjusted to provide modulo 3 or 4 or higher dithering. Also, as stated above, the non binary values may be adjusted to optimize the particular imaging system.

Figure 3:
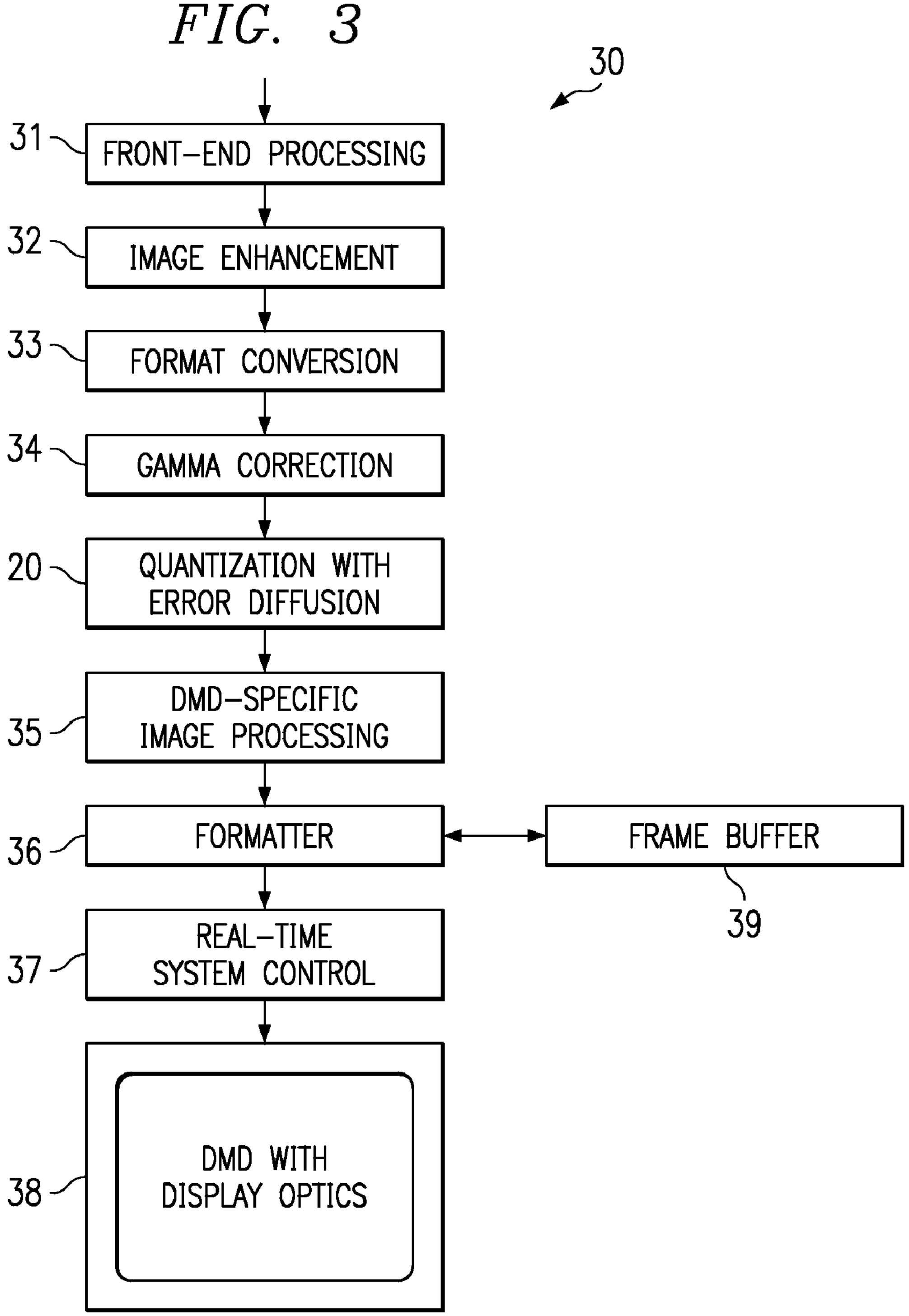
FIG. 3 is a block diagram of a DMD-based imaging system having the quantizer of FIG. 2.

FIG. 3 is a block diagram of a DMD-based display system 30 having a quantizer 20 in accordance with the invention. Such systems are commercially available from Texas Instruments Incorporated. A front end processing unit 31 receives input data from an external source, and performs processing such as analog to digital conversion, video decoding, deinterlacing, scaling, and on screen display generation. An image enhancement unit 32 performs tasks such as noise reduction, sharpness enhancement, and contrast adjustment. A format conversion unit 33 performs color space conversion. A gamma correction unit 34 performs gamma correction, resulting in the 14-bit fractional data described above as being the input to the quantization unit 20. Quantization unit 20 has the structure and function described above in connection with FIG. 2. Further image processing, specific to the DMD is performed by image processing unit 35. A formatter 36 receives a frame of data from buffer 39 and formats in the time slice format appropriate for the DMD 38. A control unit 37 provides various timing and control signals to the DMD 38, which generates the images for display. The DMD display unit 38 includes display optics, such as a projector and related lenses, used to project the image to a screen or other image plane.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A non binary quantization unit for a digital imaging system, comprising:

an adder for adding an input value to a diffused error value, thereby producing an error-corrected input value;

a look up table for receiving and converting the error-corrected input value to a non binary output value and for determining the quantization error value; and an error diffusion filter for filtering the quantization error value and delivering the filtered, diffused error value to the adder.

2. The quantization unit of claim 1, wherein the all or part of the error-corrected input value corresponds to an address of the look up table.

3. The quantization unit of claim 1, wherein the look up table quantizes the LSB of the input value.

4. The quantization unit of claim 1, wherein the look up table quantizes multiple bits of the input value.

5. A mixed binary and non binary quantization unit for a digital imaging system, comprising:

a first adder for adding an input value to a diffused error value, thereby producing an error corrected input value;

a look up table for setting a binary dither bit and at least two non binary bits, and for determining the quantization error value;

an error diffusion filter for filtering the quantization error value and delivering the filtered diffusion error value to the adder;

a multiplier for multiplying the binary dither bit times a gain value;

a second adder for receiving the output of the multiplier and for adding this output to the error-corrected input value; and a quantizer for quantizing the output of the adder.

6. The quantization unit of claim 5, wherein the all or part of the error-corrected input value corresponds to an address of the look up table.

7. The quantization unit of claim 5, wherein the look up table quantizes the LSB of the input value.

8. The quantization unit of claim 5, wherein the look up table quantizes multiple bits of the input value.

9. A method of compensating for quantization error in image data, comprising the steps of:

correcting current input pixels with an error value calculated from a previously processed input pixel;

calculating a non binary quantization value for one or more bits of the error corrected input pixel value; and calculating a new error value.

10. The method of claim 9, wherein the calculating step is performed by calculating a non binary quantization value for only the least significant bit of the error corrected input pixel.

11. The method of claim 9, wherein the calculating step is performed by calculating a non binary quantization value for multiple bits of the error corrected input value.

12. The method of claim 9, further comprising the step of determining whether one or more bits of the error corrected input pixel value should be quantized in a binary manner.

13. The method of claim 9, further comprising the step of calculating a binary quantization value for one or more bits of the error corrected input pixel value.

14. The method of claim 9, wherein the calculating step is performed using a look up table.

15. The method of claim 14, wherein the all or part of the error-corrected input value corresponds to an address of the look up table.

16. The method of claim 9, wherein the input data is at least partially fractional data.

17. An image display system having an imaging device, comprising:

one or more processing units for processing input pixel data, the processing units comprising at least a quantization unit having at least: an adder for adding an input value to a diffusion error value, thereby producing an error-corrected input value, a look up table for receiving and converting the error-corrected input value to a non binary output value and for determining the diffusion error value; and an error diffusion filter for filtering the diffusion error value and delivering the filtered diffusion error value to the adder;

a formatter for formatting the output of quantization unit into a format useable by the imaging device;

a frame buffer for storing frames of formatted image data;

a control unit for generating control signals for controlling the imaging device; and an imaging device unit comprising the imaging device and display optics.

18. The image display system of claim 17, wherein the quantizer performs non binary quantization on a portion of the input value and binary quantization of the remaining portion of the input value, and wherein the quantizer further comprises: a second adder for receiving the output of the multiplier and for adding this output to the error-corrected input value; and a quantizer for quantizing the output of the adder.

19. The image display system of claim 18, wherein the look up table generates a binary dither bit that determines whether binary or non binary quantization is to be performed.

20. The image display system of claim 17, wherein the imaging device is a digital micro mirror device.

* * * * *